Sept. 5, 1933.         D. A. MURPHY              1,925,335
                BALL JOINT STEEL HOSE COUPLING
                     Filed Dec. 12, 1930

Inventor
Demery Ambrose Murphy
By Lyon & Lyon
Attorneys

Patented Sept. 5, 1933

1,925,335

UNITED STATES PATENT OFFICE 1,925,335

BALL JOINT STEEL HOSE COUPLING

Demery Ambrose Murphy, Torrance, Calif., assignor to The National Supply Company, Toledo, Ohio, a corporation of Ohio Application December 12, 1930
Serial No. 501,865

6 Claims. (Cl. 285—92)

This invention relates to ball joint steel hose couplings, and more particularly to a flexible coupling means for steel hoses which will be freely flexible under working pressure.

An object of this invention is to provide a steel hose coupling which is of simple construction and which includes a means for coupling together two ends of a steel hose in a manner to permit relative turning of the ends of said steel hose as well as relative tilting of the ends thereof.

Another object of this invention is to provide a steel hose coupling including a pair of ball connecting members and means for connecting together the ball connecting members in a manner to permit relative rotation of said ball coupling members and relative tilting of said ball coupling members, and in which there is provided a simple and inexpensive means for packing the said ball coupling members.

Other objects and advantages of this invention it is believed will be apparent from the following detailed description of a preferred embodiment thereof as illustrated in the accompanying drawing.

Figures 1, 2:
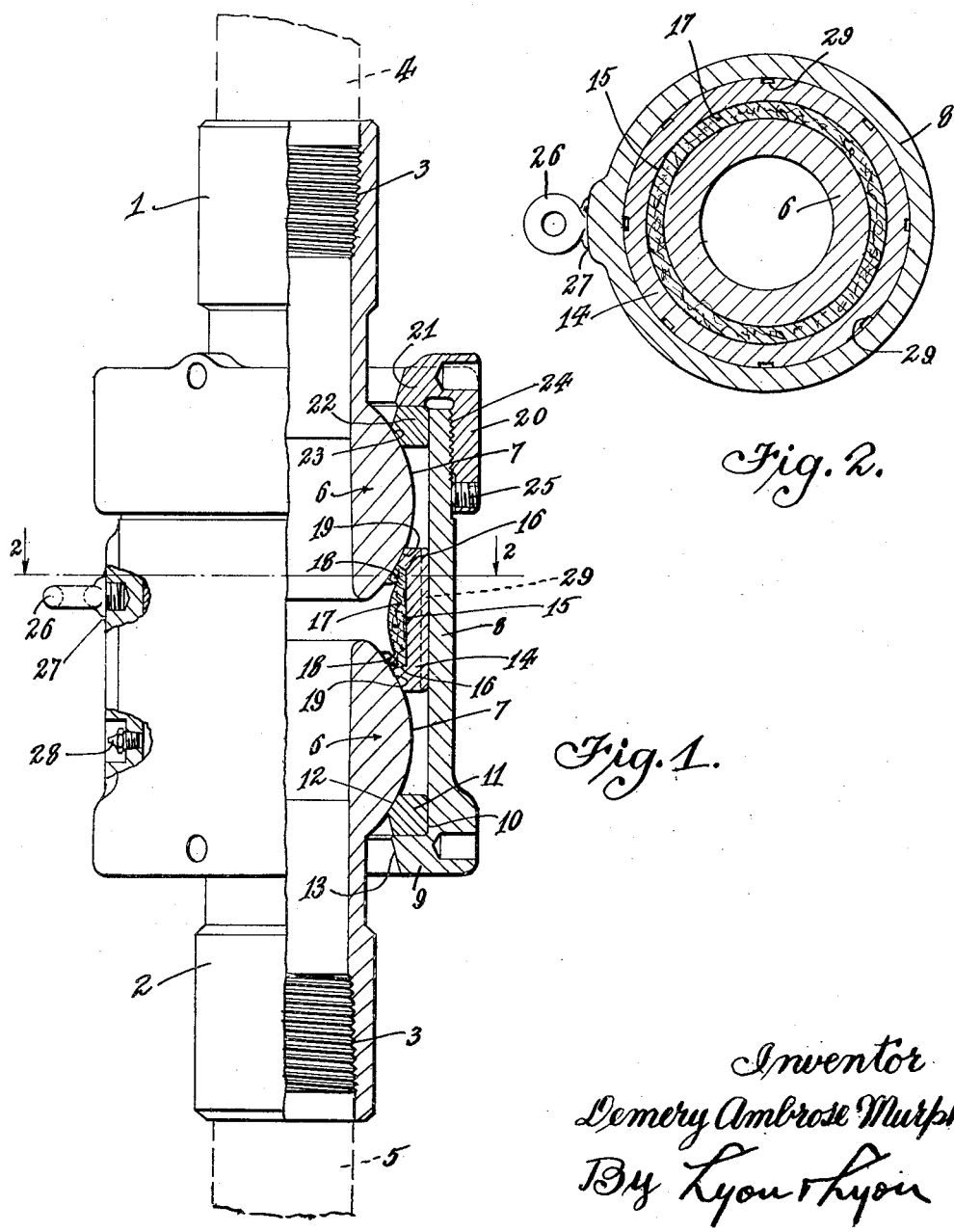
Figure 1 is a side elevation partly in section of a ball joint steel hose coupling member embodying my invention.
Figure 2 is an end section thereof taken substantially on the line 2—2 of Figure 1.

In the preferred embodiment of my invention illustrated in the accompanying drawing, 1 and 2 indicate ball coupling members which are adapted to be threaded as indicated at 3 to the respective ends 4 and 5 of a steel hose. Formed in the adjacent ends of the ball coupling members 1 and 2 are sphere segments 6 having spherical or ball exterior peripheries 7.

Means are provided for coupling the ball connecting members 1 and 2 together and for packing the ball peripheries 7 one to the other so as to permit a relative rotation of the members 1 and 2 as well as relative tilting of the coupling members 1 and 2, which means preferably includes cylindrical housing 8 into which ball ends 6 of the coupling members are projected. At one end the cylindrical housing 8 is provided with an inwardly projecting annular flange 9 forming a bearing race 10 within which bearing ring 11 is mounted. The bearing ring 11 has its bearing face 12 formed to the curvature of the ball periphery 7, and the ball end 6 of the lower coupling member 2 seats upon the bearing face 12.

The flange 9 is tapered as indicated at 13 so as to permit of a more unrestricted tilting of the coupling member 2 within the cylindrical housing 8. Mounted within the cylindrical housing 8 above the ball head 6 of the coupling member 2 is a packing retaining ring 14 which is provided with an annular packing seat 15 on its inner periphery, the seat 15 being tapered as indicated at 16 at its upper and lower extremities. Mounted on the seat 15, to engage the tapered portions 16 thereof, is a flexible packing band 17, the ends 18 of which are folded back over the central portion of the flexible packing ring 17.

One folded back end 18 of the flexible packing ring 17 engages the ball periphery 7 of the ball head 6 of the lower coupling member 2, and the other folded back end 18 of the flexible packing ring 17 engages the ball periphery 7 of the ball head 6 of the coupling member 1 and the interior of the flexible packing ring 17 is open to the fluid under pressure which passes through coupling members 1 and 2 so that the folded back ends 18 of the flexible packing ring 17 are expanded outwardly against the spherical contours of the coupling members 1 and 2 by the fluid under pressure, thereby packing one ball head 6 of one coupling member to the ball head 6 of the other coupling member. Packing ring 14 is likewise provided with arcuate bearing faces 19 formed to the spherical contour of the ball ends 6 of the coupling members 1 and 2 providing a bearing support upon which the balls 6 rotate within the cylindrical housing 8.

In order to adjustably secure the ball ends 6 to the upper coupling member 1 in the cylindrical housing 8 so that the same is properly positioned in relation to the flexible packing ring 17 and the packing retaining ring 14, and in order to position the flexible packing ring 17 and the packing retaining ring 14 which is floating within the cylindrical housing 8 in relation to the ball head 6 of the lower coupling member 2, a cap 20 is provided for the cylindrical housing 8, and is provided with an inwardly extending annular flange 21 which engages the upper bearing ring 22 to adjust the bearing ring 22 to the spherical contour 7 of the ball end 6 of the coupling member 1.

The bearing ring 22 is provided with an arcuate bearing seat 23 formed to the spherical contour 7 of the ball end 6 of the coupling member 1. The cap 20 is internally threaded as indicated at 24 and is threaded upon the upper end of the cylindrical housing 8 at the threads 24 adjustably so as to adjust the position of the ball end 6 of the coupling member 1 in relation to the ball end 6 of the coupling member 2. After the cap 20 has been threadedly adjusted on the cylindrical housing 8, it is locked in position by means of a lock screw 25 threaded into the cap 20.

In order to suspend the steel hose in position in a well drilling derrick or at other points desired, an eye 26 is welded as indicated at 27 to the cylindrical housing 8.

In order to lubricate the swing joint a grease fitting 28 is threaded into the cylindrical housing 8 and the packing retaining ring 14 is provided with vertically extending grease grooves 29. Grease can thereby be forced into the cylindrical housing 8 and will pass through the grease grooves 29, maintaining both ball ends 6 of the coupling members 1 and 2 properly lubricated.

Having fully described my invention, it is to be understood that I do not wish to be limited to the details herein set forth, but my invention is of the full scope of the appended claims.

I claim:

1. In a ball joint steel hose coupling, the combination of a pair of coupling members adapted to be secured to the ends of a steel hose and having ball heads at their adjacent ends, a housing into which the ball heads extend, a bearing ring supported by the housing upon which one of said ball heads is supported, a packing retaining ring mounted within the housing between the ball heads, a packing supported by the packing retaining ring in position to pack one ball head to the other, and a cap adjustably secured to the cylindrical housing in position to adjust the ball heads in position within the housing.

2. In a device of the class described, the combination of a pair of ball coupling members having fluid passages formed therethrough, a housing for connecting the ball coupling members, bearing rings mounted within the housing for supporting the ball heads of the ball headed coupling members, a packing retaining ring mounted within the housing between the ball coupling members, a flexible packing ring supported by the packing retaining ring in position to pack the ball heads of the coupling members together, and means secured to the housing for adjusting one of said bearing rings within the housing.

3. In a device of the class described, the combination of a pair of coupling members adapted to be secured to the end of a steel hose and having ball heads at their adjacent ends, a housing into which the ball heads extend, the housing having an inwardly extending integral annular flange at one end, a bearing ring positioned on the flange to provide a bearing for one of the ball heads, a retaining ring mounted within the housing intermediate the ball heads and providing bearing means for the adjacent ball heads, a bearing ring mounted within the housing near the upper end thereof, and providing a bearing for the outer end for the latter said ball head member, a cap adjustably secured to the open end of the housing, and being provided with an inwardly extending annular flange adapted to engage the later said bearing ring so as to adjust the assembly of bearing rings, retaining ring and ball head members within said housing.

4. In a device of the class described, the combination of a pair of ball coupling members having fluid passages formed therethrough, a housing within which the ball coupling members are mounted, bearing rings mounted within the housing at the opposed ends thereof to engage and provide bearings for the peripheries of the ball coupling members adjacent the ends of the housing, a slidably mounted retaining ring positioned within the housing intermediate the ball coupling members and providing bearing means for the peripheries of the ball coupling members adjacent their inner end, and packing means carried by the retaining ring for packing the coupling members at their inner adjacent ends.

5. In a device of the class described, the combination of a pair of ball coupling members having fluid passages formed therethrough, a housing within which the ball coupling members are mounted, bearing rings mounted within the housing at the opposed ends thereof to engage and provide bearings for the peripheries of the ball coupling members adjacent the ends of the housing, a slidably mounted retaining ring positioned within the housing intermediate the ball coupling members and providing bearing means for the peripheries of the ball coupling members adjacent their inner end, packing means carried by the retaining ring for packing the coupling members at their inner adjacent ends, means for admitting grease into the grease chamber within the housing, and the slidably mounted retaining ring being formed to provide passages to permit the grease to pass to both ends of the housing around the peripheries of each of the ball coupling members.

6. In an apparatus of the class described, the combination of a pair of ball coupling members having fluid passages formed therethrough, a housing within which the ball coupling members are mounted, bearing rings mounted within the housing at the opposed ends thereof to engage and provide bearings for the peripheries of the ball coupling members adjacent the ends of the housing, a slidably mounted retaining ring positioned within the housing intermediate the ball coupling members and providing bearing means for the peripheries of the ball coupling members adjacent their inner ends, a lubricant enclosure formed around each of the ball coupling members between the bearing ring and retaining ring, and a connection for supplying lubricant to said enclosures.

DEMERY AMBROSE MURPHY.